United States Patent [19]

Kasugai et al.

[11] Patent Number: 5,148,934
[45] Date of Patent: Sep. 22, 1992

[54] CAP HAVING A VALVE THEREIN

[75] Inventors: Joji Kasugai, Ichinomiya; Hiroyuki Hagano, Inazawa; Norikazu Hosokawa, Nishikasugai, all of Japan

[73] Assignee: Toyoda Gosei Co., Ltd., Nishikasugai, Japan

[21] Appl. No.: 671,421

[22] Filed: Mar. 20, 1991

[30] Foreign Application Priority Data

Mar. 20, 1990 [JP] Japan ................................. 2-70767

[51] Int. Cl.5 ............................................. B65D 51/16
[52] U.S. Cl. ................................... 220/203; 220/303; 220/DIG. 32
[58] Field of Search ............... 220/203, 303, DIG. 32, 220/DIG. 33

[56] References Cited

U.S. PATENT DOCUMENTS

| 4,498,493 | 2/1985 | Harris | 220/203 X |
|---|---|---|---|
| 4,540,103 | 9/1985 | Kasugai et al. | |
| 4,572,396 | 2/1986 | Kasugai et al. | |
| 4,588,102 | 5/1986 | Kasugai | |
| 4,666,056 | 5/1987 | Kasugai et al. | |
| 4,676,390 | 6/1987 | Harris | 220/203 |
| 4,724,868 | 2/1988 | Kasugai et al. | |
| 4,726,488 | 2/1988 | Kasugai | |
| 4,785,961 | 11/1988 | Kasugai et al. | |
| 4,795,053 | 1/1989 | Kasugai et al. | |
| 4,815,705 | 3/1989 | Kasugai et al. | |
| 4,854,471 | 8/1989 | Kasugai et al. | |
| 4,944,425 | 7/1990 | Kasugai et al. | |

FOREIGN PATENT DOCUMENTS 62-65945  4/1987  Japan .

*Primary Examiner*—Stephen Marcus
*Assistant Examiner*—Paul A. Schwarz
*Attorney, Agent, or Firm*—Cushman, Darby & Cushman

[57] ABSTRACT

A cap for a container such as a gas tank or radiator including a valve built therein. The valve built into the cap works to equalize pressure between that inside the container and the exterior environment. The cap includes a valve subassembly joined with the body of the cap, the valve subassembly functioning to equalize the pressure by allowing ingress or egress of air.

3 Claims, 2 Drawing Sheets

CAP HAVING A VALVE THEREIN

BACKGROUND OF THE INVENTION

1. Field of the Invention

This invention relates to a cap having a valve built therein. More particularly, the invention relates to caps such as a fuel cap or a radiator cap for an automobile, which is installed on an aperture of a container such as a fuel tank or a radiator and adjusts pressure in the container.

2. Description of the Prior Art

A Cap having a valve built therein is disclosed in U.S. Pat. No. 4,726,488.

A conventional cap having a valve therein comprises a cap body and a valve body. In the cap, an annular seal member is provided with an inner lip element and an outer lip element. The lip elements project in the same direction. An inner coil spring and an outer coil spring are disposed on opposite sides of the lip elements, and both coil springs align with the inner lip element and the outer lip element. A cap with a valve includes a seal member disposed in a fluid flow path of a cap body and urged against a prescribed seal portion. The seal member is of a disk-like form or ring-form. Further, the seal member is provided with lip elements that project the entire circumference of the peripheral surface and the lip elements have a constant length at a rear side. Unlike the present invention, there is no real valve subassembly within the cap.

SUMMARY OF THE INVENTION

According to the present invention, there is provided a cap having a valve built therein. The cap comprises a cap body that may be installed on an aperture of a container such as a gas tank or radiator, a valve body joined to the cap body, the valve body including an annular seal member, an inner coil spring, an outer coil spring, a core member, a guide plate and an outer spring shoe plate. The annular seal member includes an inner lip element and an outer lip element both extending in the same direction. The inner coil spring and the outer coil spring are disposed on a side of said annular seal member opposite the lip elements with the inner and outer coil springs being respectively aligned with the inner and outer lip element.

The core member is disposed inside of the inner coil spring and the annular seal member. The core member is provided with an inner spring shoe portion at a first end thereof and an inner lip shoe portion at a second end thereof. A first end of the inner coil spring is maintained in constant contact with the inner lip shoe portion. Further the inner lip shoe portion forms an inner seal portion with the inner lip element.

The guide plate is disposed next to the core member with a gap therebetween and on the back of said annular seal member. Contact is maintained respectively between a second end of the inner coil spring and a first end of the outer coil spring and the guide plate.

The outer spring shoe plate is fixed in the cap body so that it maintains contact with a second end of the outer coil spring. An inner lip housing is formed by said inner lip shoe portion and said guide plate so that the inner lip housing becomes larger toward an inner circumference side.

An object of the present invention is to provide a cap having a valve which includes a valve mechanism subassembly. Furthermore, the present invention provides a cap having a valve that does not compress the valve when the valve mechanism subassembly is constructed. Therefore, the present invention has a long life.

BRIEF DESCRIPTION OF THE DRAWING

Other objects, features and characteristics of the present invention, as well as the functions of the related elements of the structure will become apparent upon consideration of the following description and the appended claims with reference to the appended drawings, all of which form a part of this specification. In the drawings, like reference numerals refer to corresponding parts, and:

DESCRIPTION OF THE PRESENTLY PREFERRED EXEMPLARY EMBODIMENT

Figure 1:
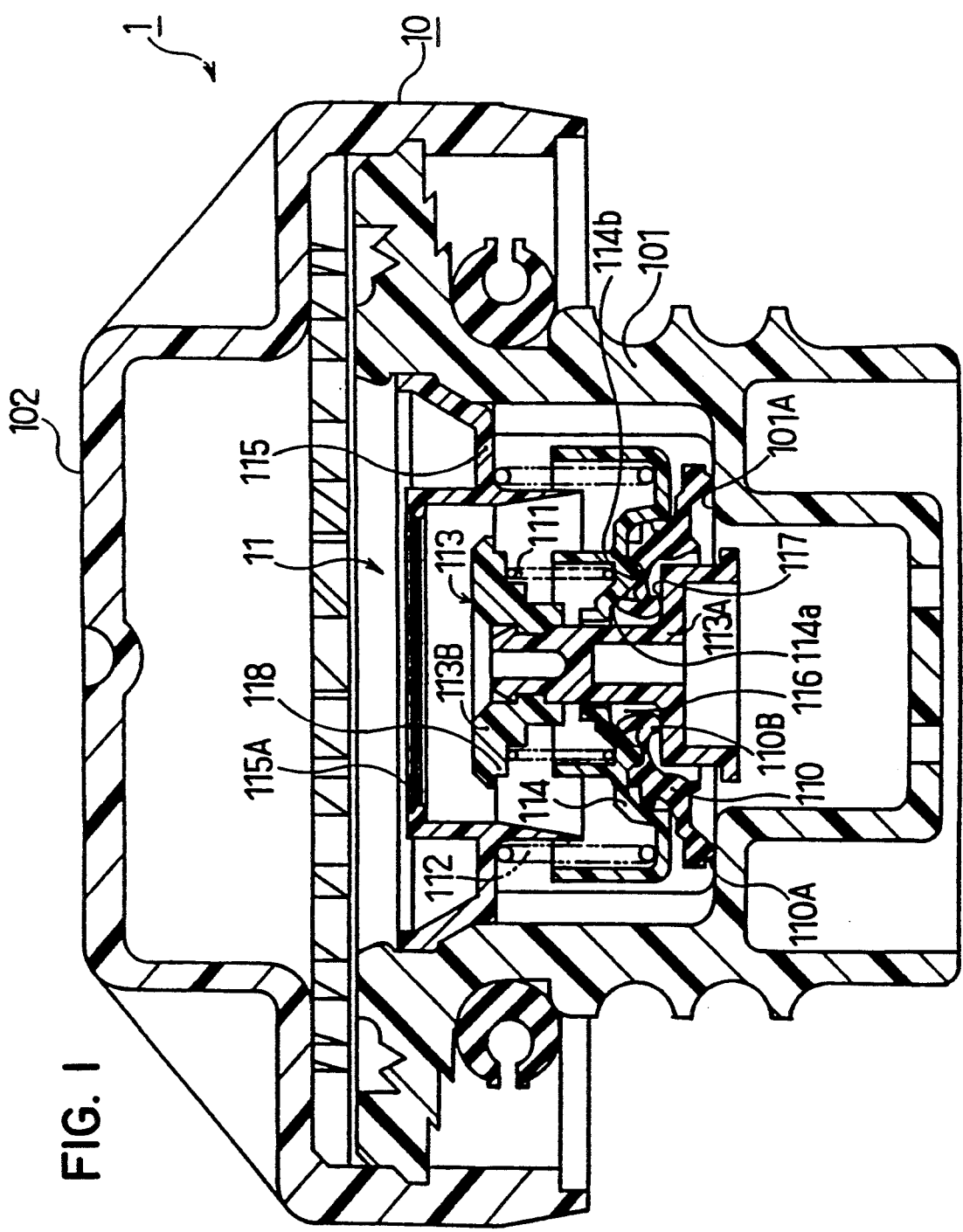
FIG. 1 is a cross-sectional view of an embodiment of a cap having a valve according to the present invention.
Figure 2:
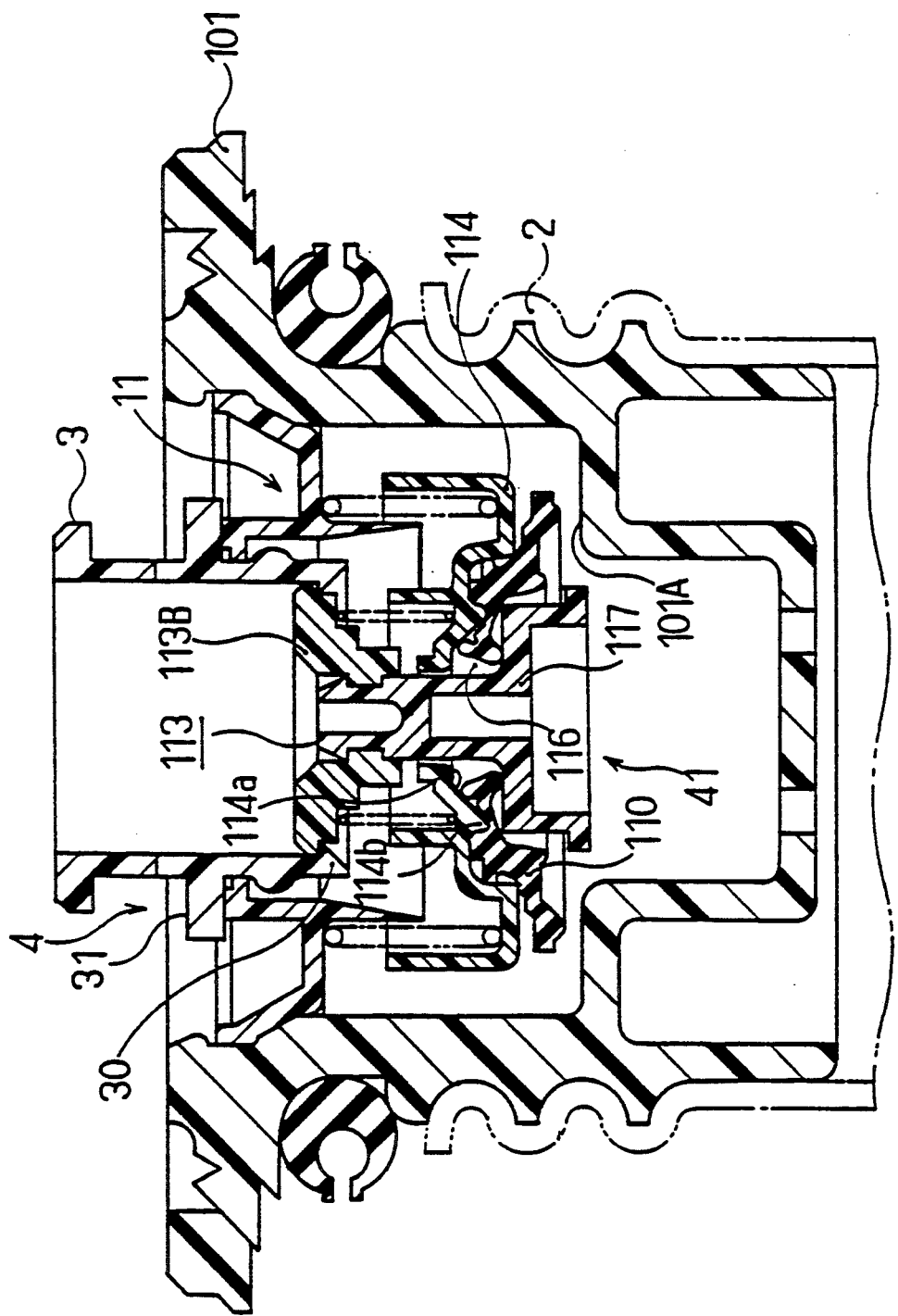
FIG. 2 is a cross-sectional view of the valve mechanism subassembly which is illustrating how the subassembly is put together.

A cap having a valve built therein 1 according to the present invention is shown in FIGS. 1 and 2. The cap is capable of being installed on aperture of a container (not shown) such as a fuel tank or a radiator. The cap having a valve built therein 1 comprises a cap 10 and a valve body 11.

The cap 10 is composed of a cylinder-shaped cap body 101 preferably made of plastic, although other materials may be used, and a disk-shaped upper cover 102 of plastic or a comparable material to be fitted to a flange portion on an upper end of the cap body 101. A thread for installing the cap to the filler neck 2 is provided on the outer circumference of the cap body 101. The cap body 101 includes an outer lip shoe portion 101A which forms an outer seal portion with an outer lip element 110A of annular seal member 110.

The valve body 11 is composed of the annular seal member 110, an inner coil spring 111, an outer coil spring 112, a core member 113, a guide plate 114 and an outer spring shoe plate 115. The annular seal member 110 is provided with an inner lip element 110B and an outer lip element 110A. The lip elements 11OA and 110B project in the same direction. The inner coil spring 111 and the outer coil spring 112 are disposed on a side opposite the lip elements 110A and 110B. Both coil springs 111 and 112 align with the inner lip element 110B and the outer lip element 110A. The core member 113 is disposed inside the inner coil spring 112 and the annular seal member 110. The core member 113 is composed of a body portion 113A and an attached portion 113B which is fixed to the body portion 113A. One end of the attached portion 113B includes an inner spring shoe portion 118 that maintains contact with the upper end of the inner coil spring 111. The other end of the body portion 113A includes an inner lip shoe portion 117 which forms an inner seal portion with the inner lip element 110B. The guide plate 114 is next to the core member 113 with a gap therebetween and is disposed on the back of the annular seal member 110. The guide plate 114 maintains contact with the lower end of the outer coil spring 112 and the lower end of the inner coil spring 111. The outer spring shoe plate 115 is fixed in the cap body 101, and maintains contact with the upper end of the outer coil spring 112. The outer spring shoe plate 115 has an opening 115A that is larger than an outer diameter of the inner spring shoe portion 118. An inner lip housing 116 is formed by the inner lip shoe portion 117 and the guide plate 114.

When the pressure within the tank becomes less than a prescribed value, negative pressure overcomes the compression stress of the inner coil spring 111, so that the core member 113 is moved to the inside of the tank, and the inner lip element 110B separates from the inner lip shoe potion 117. A gap is produced between the inner lip element 110B and the inner lip shoe portion 117. Consequently, air from outside the cap 10 flows into the tank through the gap between the core member 113 and the guide plate 114 and the gap between the inner lip element 110B and the inner lip shoe portion 117. Thereby the negative pressure state within the tank is eliminated.

Also, when the pressure within the tank becomes greater than a prescribed value, the positive pressure overcomes the compression stress of the outer coil spring 112, so that the tank, and the outer lip element 110 separate from the outer lip shoe portion 101A. A gap is produced between the outer lip element 110A and the outer lip shoe portion 101A. Consequently, fluid such as air inside the tank flows out of the tank through the gap between the outer lip element 110A and the outer lip shoe portion 101A. Thereby the positive pressure state within the tank is eliminated.

The cap having a valve built therein is assembled as follows. The annular seal member 110, the guide plate 114, the inner coil spring 111 and the attached portion 113B are assembled to the body portion 113A so as to make a preliminary valve assembly 41. Then, the preliminary valve assembly 41, the outer coil spring 112 and the outer spring shoe plate 115 are assembled to an assembly implement 3 so as to make a valve mechanism subassembly 4. The valve mechanism subassembly 4 then is assembled in the cap body 101. Next, the assembly implement 3 is removed. Thereafter, the upper cover 102 is assembled to the cap body 101, thereby the cap with valve is completed.

The assembly implement 3 is shaped like a hollow cylinder. An inner circumference portion of the assembly implement 3 includes a flange portion 30 that holds the inner spring shoe portion 118. An outer circumference portion of the assembly implement 3 includes a stopper portion 31 that to hold the outer spring shoe portion 115.

The preliminary valve assembly 41 is assembled to the assembly implement 3 by the following procedure. The outer spring shoe portion 115 is moved into contact with the stopper portion 31. In this state, the core member 113 is pushed into the assembly implement 3, and the inner spring shoe portion 118 is held on to the flange portion 30. When the core member 113 is pushed, the core member 113 overcomes elastic force of the outer coil spring 112 and moves to the assembly implement 3. Thus, the inner lip element 110B receives compression stress from the guide plate 114 and the inner lip shoe portion 117. When the inner lip element 110B gets the compression stress, the inner lip element 110B slides on a taper surface 114a of the guide plate 114 and moves to the inner circumference side, thereby a projection 114b of the guide plate 114 takes charge of the compression stress. Therefore, the inner lip element 110B is not damaged or deteriorated under the compression stress when the preliminary valve assembly 41 is assembled to the assembly implement 3.

While the invention has been described in connection with what is presently considered to be the most practical and preferred embodiment, it is to be understood that various modifications and equivalent arrangements are intended to be included within the spirit and scope of the appended claims.

What is claimed is:

1. A cap having a valve built therein, comprising:
   a cap body that can be installed on an aperture of a container; and
   a valve body joined to said cap body, said valve body including an annular seal member, an inner coil spring, an outer coil spring, a core member, a guide plate and an outer spring shoe plate;
   wherein said annular seal member includes an inner lip element and an outer lip element 110A, both extending in a first direction;
   wherein said guide plate includes a taper surface and a projection;
   said inner lip element has a first and second end;
   said first end of said inner lip element contacts the guide plate along said taper surface;
   said second end of said inner lip element contacts said core member at an inner lip shoe portion;
   said projection extends from said taper surface in about the same direction as said second end of said inner lip element; and
   said projection fits into a space provided in said annular seal member.

2. A cap having a valve built therein according to claim 1, wherein said cap body includes threads formed on an outer surface thereof.

3. A cap having a valve built therein according to claim 1, further comprising an upper cover joined to said cap body.

* * * * *